US012731308B2

(12) United States Patent
Babanin et al.

(10) Patent No.: US 12,731,308 B2
(45) Date of Patent: Sep. 8, 2026

(54) GENERATION AND MANAGEMENT OF PERSONALIZED IMAGES USING MACHINE LEARNING TECHNOLOGIES

(71) Applicant: Snap Inc., Santa Monica, CA (US)

(72) Inventors: Ivan Babanin, London (GB); Aleksandr Belskikh, London (GB); Roman Golobokov, London (GB); Ivan Hladush, Lehi, UT (US); Volodymyr Kalinichenko, Lehi, UT (US); Hee Hun Kim, Los Angeles, CA (US); Diana Maksimova, London (GB); Alexandr Marinenko, Lehi, UT (US); Daniel Moreno Cuellar, New York, NY (US); Anton Pankratov, Edinburgh (GB); Hanna Rulevska, Almere (NL); Pavel Savchenkov, London (GB); Sergey Smetanin, London (GB); Jeremy Baker Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 304 days.

(21) Appl. No.: 18/232,938

(22) Filed: Aug. 11, 2023

(65) Prior Publication Data

US 2025/0054210 A1 Feb. 13, 2025

(51) Int. Cl.
*G06T 11/23* (2026.01)
*G06F 3/0482* (2013.01)
(Continued)

(52) U.S. Cl.
CPC ............ *G06T 11/23* (2026.01); *G06F 3/0482* (2013.01); *G06T 7/50* (2017.01); *G06T 7/70* (2017.01)

(58) Field of Classification Search
CPC . G06T 11/203; G06T 7/50; G06T 7/70; G06F 3/0482
See application file for complete search history.

(56) References Cited

U.S. PATENT DOCUMENTS 11,169,675 B1 * 11/2021 Anvaripour ............. H04L 51/52
11,288,880 B2 * 3/2022 Shaburov ............. G06V 40/172
(Continued)

FOREIGN PATENT DOCUMENTS

WO WO-2025038351 A1 2/2025

OTHER PUBLICATIONS

Jeong, Hyeonho, Gihyun Kwon, and Jong Chul Ye. "Zero-shot generation of coherent storybook from plain text story using diffusion models." arXiv preprint arXiv:2302.03900 https://doi.org/10.48550/arXiv.2302.03900 (Year: 2023).*
(Continued)

*Primary Examiner* — Daniel F Hajnik
(74) *Attorney, Agent, or Firm* — Schwegman Lundberg & Woessner, P.A.

(57) ABSTRACT

Various examples described herein support or provide generation and management operations of personalized images using machine learning technologies, including receiving portrait images of an entity; using machine learning models to generate an identity that represents the entity; identifying a template that comprises text descriptions of a scene and conditions; and using a machine learning models to generate a personalized image based on the identity and the template.

18 Claims, 15 Drawing Sheets

(51) Int. Cl.
*G06T 7/50* (2017.01)
*G06T 7/70* (2017.01)

(56) References Cited

U.S. PATENT DOCUMENTS

| | | | | |
|---|---|---|---|---|
| 2007/0257920 | A1* | 11/2007 | Neider | G06T 13/40 345/473 |
| 2014/0041056 | A1* | 2/2014 | Stoop | G06F 21/6263 726/28 |
| 2015/0193829 | A1 | 7/2015 | Mukherjee | |
| 2021/0385179 | A1* | 12/2021 | Heikkinen | G06F 3/0482 |
| 2022/0319075 | A1 | 10/2022 | Hu et al. | |
| 2024/0265204 | A1* | 8/2024 | Meeks | G06F 40/279 |

OTHER PUBLICATIONS

Jin, Ze, and Zorina Song. "Generating coherent comic with rich story using ChatGPT and Stable Diffusion." arXiv preprint arXiv: 2305.11067 https://doi.org/10.48550/arXiv.2305.11067 (Year: 2023).*

Ruiz, Nataniel, et al. "DreamBooth: Fine Tuning Text-to-Image Diffusion Models for Subject-Driven Generation." arXiv preprint arXiv:2208.12242v2 (Mar. 2023). (Year: 2023).*

"Absolutely Crazy Ending to MTG Arena Sealed Open Day One", [Online]. Retrieved from the Internet: <URL: https://youtu.be/2yxVAyRK7RA?t=15>, (Published May 20, 2023), 3 pgs.

"Alternative Text", Office for Digital Accessibility (ODA), University of Minnesota, [Online]. Retrieved from the Internet: <URL: https://web.archive.org/web/20250114041208/https://accessibility.umn.edu/getting-started/learn-7-core-accessibility-skills/alternative-text>, (Archived on Jan. 14, 2025), 13 pgs.

"Contrast Checker", WebAIM, web accessibility in mind, (Archived on Jan. 31, 2023), 2 pgs.

"International Application Serial No. PCT/US2024/041262, International Search Report mailed Nov. 15, 2024", 4 pgs.

"International Application Serial No. PCT/US2024/041262, Written Opinion mailed Nov. 15, 2024", 7 pgs.

"Make Apps More Accessible", [Online]. Retrieved from the Internet: <https://web.archive.org/web/20220318041934/https://developer.android.com/guide/topics/ui/accessibility/apps>, (Archived on Mar. 18, 2022), 6 pgs.

"Supporting VoiceOver in Your App", [Online]. Retrieved from the Internet: <https://developer.apple.com/documentation/uikit/supporting-voiceover-in-your-app>, (Retrieved on Mar. 18, 2025), 6 pgs.

"Text Legibility", Material Design, [Online]. Retrieved from the Internet: <URL: https://web.archive.org/web/20230107134917/https://m2.material.io/design/color/text-legibility.html#legibility-standards>, (Archived on Jan. 7, 2023), 16 pgs.

Jing, Shi, et al., "InstantBooth: Personalized Text-to-Image Generation without Test-Time Finetuning", Arxiv. Org, Cornell University Library, 201 Olin Library Cornell University Ithaca, NY 14853, (Apr. 6, 2023).

* cited by examiner

1202

1204

9:41

1212

MY DREAMS

DREAMS LIMITED
EDITION JUNE 2023

ANCIENT
MYTHS

1206

NONE

DAN

EVAN

DIANA

GENERATE PACK

DONE

9:41

1210

MY DREAMS
WITH DAN

DREAMS LIMITED
EDITION JUNE 2023

1208

ACTION
MOVIE

GENERATE PACK
8 DREAMS,$0.99

GENERATION AND MANAGEMENT OF PERSONALIZED IMAGES USING MACHINE LEARNING TECHNOLOGIES

TECHNICAL FIELD

The present disclosure generally relates to data management and, more particularly, various examples described herein provide for systems, methods, techniques, instruction sequences, and devices that facilitate the generation and management of personalized images using machine learning technologies.

BACKGROUND

Current systems face challenges when it comes to using machine learning models to generate personalized narrative images that depict portraits of users along with story scenes. It is challenging to generate a personalized narrative image that illustrates more than one user in a story scene and to allow such an image to be edited, augmented, and shared among other users.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
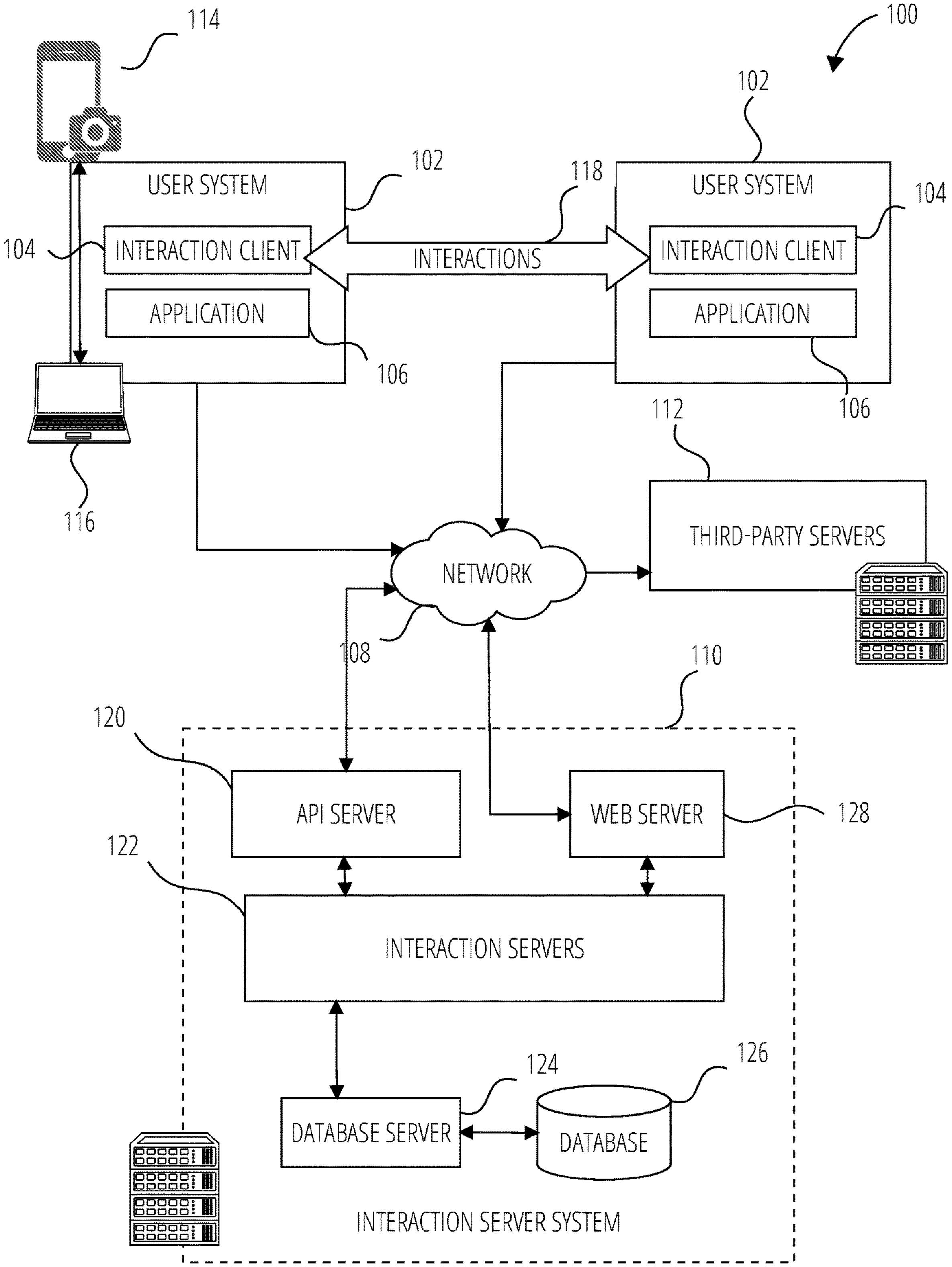
FIG. 1 is a diagrammatic representation of a networked environment in which the present disclosure may be deployed, according to some examples.

The description that follows includes systems, methods, techniques, instruction sequences, and computing machine program products that embody illustrative examples of the present disclosure. In the following description, for purposes of explanation, numerous specific details are set forth in order to provide a thorough understanding of examples. It will be evident, however, to one skilled in the art that the present inventive subject matter can be practiced without these specific details.

Reference in the specification to "one example" or "an example" means that a particular feature, structure, or characteristic described in connection with the example is included in at least one example of the present subject matter. Thus, the appearances of the phrase "in one example" or "in an example" appearing in various places throughout the specification are not necessarily all referring to the same example.

For purposes of explanation, specific configurations and details are set forth in order to provide a thorough understanding of the present subject matter. However, it will be apparent to one of ordinary skill in the art that examples of the subject matter described can be practiced without the specific details presented herein, or in various combinations, as described herein. Furthermore, well-known features can be omitted or simplified not to obscure the described examples. Various examples may be given throughout this description. These are merely descriptions of specific examples. The scope or meaning of the claims is not limited to the examples given.

Current systems face challenges when it comes to using machine learning models to generate personalized narrative images that depict portraits of users along with story scenes. Specifically, images generated by current systems can be avatar-oriented, where an image only depicts a user's portrait. In contrast, personalized narrative images described herein depict users along with story scenes associated with one or more themes. Thereby, such an image is more meaningful in a way that it can be used to tell a story and/or convey a message. Further, current systems face further challenges when it comes to generating personalized narrative images that illustrate more than one user based on AI-generated identities and allow such images to be edited (e.g., with media overlays), augmented, and shared among other users to facilitate user engagement with various resources provided by the systems.

Various examples described herein can use state-of-the-art machine-learning (ML) and artificial intelligence (AI) technologies to generate and manage AI-generated personalized images (also referred to as personalized narrative images or personalized images). As used herein, a machine learning model (e.g., a stable diffusion model) can comprise any predictive model generated based on (or trained on) training data. Stable diffusion models can be controlled by one or more deep learning algorithms (e.g., ControlNet) based on various conditions described herein. Specifically, a stable diffusion model can generate synthesized images (e.g., personalized narrative images) based on text prompts and one or more conditions (e.g., a sketch, a pose map, a depth map, a normal map, or a canny edge). Conditions can also be referred to as visual resources or conditionings, as described herein. A condition, such as a sketch, can be a control image that defines an entity's general shape and position (e.g., a person or an animal) in the image. In various embodiments, a text prompt can be a positive text prompt or a negative text prompt. A combination of both positive text prompts and negative text prompts can be used to generate one or more templates described herein. A negative text prompt can provide more stable results with fewer artifacts. In various embodiments, a positive text prompt can steer the diffusion toward the images associated with it, whereas a negative text prompt can steer the diffusion away from it. In various embodiments, a text prompt (e.g., a positive text prompt or a negative text prompt) can be updated to generate a modified template (e.g., template 806).

In various examples, a stable diffusion model can be trained based on a large data set, including a large number of images. Further, a stable diffusion model can generate an identity that represents an entity based on the entity's images (e.g., portrait images, such as selfie images). Once generated and trained, a machine learning model (e.g., a stable diffusion model) can receive one or more inputs (e.g., text prompts, conditions), extract one or more features, and generate an output (e.g., personalized narrative images) for the inputs based on the model's training. Different types of machine learning models can include, without limitation, ones trained using supervised learning, unsupervised learning, reinforcement learning, or deep learning (e.g., complex neural networks).

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can communicate with locally hosted applications 106 using Applications Program Interfaces (APIs).

Each user system 102 may include multiple user devices, such as a mobile device 114, wearable apparatuses, and a computer client device 116 that are communicatively connected to exchange data and messages.

An interaction client 104 interacts with other interaction clients 104 and with the interaction server system 110 via network 108. The data exchanged between the interaction clients 104 (e.g., interactions 118) and between the interaction clients 104 and the interaction server system 110 includes functions (e.g., commands to invoke functions) and payload data (e.g., text, audio, video, or other multimedia data).

The interaction server system 110 provides server-side functionality via network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 120 is coupled to and provides programmatic interfaces to interaction servers 122, making the functions of the interaction servers 122 accessible to interaction clients 104, other applications 106 and third-party server 112. The interaction servers 122 are communicatively coupled to a database server 124, facilitating access to a database 126 that stores data associated with interactions processed by the interaction servers 122. Similarly, a web server 128 is coupled to the interaction servers 122 and provides web-based interfaces to the interaction servers 122. To this end, the web server 128 processes incoming network requests over the Hypertext Transfer Protocol (HTTP) and several other related protocols.

The Application Program Interface (API) server 120 receives and transmits interaction data (e.g., commands and message payloads) between the interaction servers 122 and the user systems 102 (and, for example, interaction clients 104 and other application 106) and the third-party server 112. Specifically, the Application Program Interface (API) server 120 provides a set of interfaces (e.g., routines and protocols) that can be called or queried by the interaction client 104 and other applications 106 to invoke the functionality of the interaction servers 122. The Application Program Interface (API) server 120 exposes various functions supported by the interaction servers 122, including account registration; login functionality; the sending of interaction data, via the interaction servers 122, from a particular interaction client 104 to another interaction client 104; the communication of media files (e.g., images or video) from an interaction client 104 to the interaction servers 122; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 122 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally installed application 106, the interaction client 104 instructs the user system 102 to launch the external resource by executing locally stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
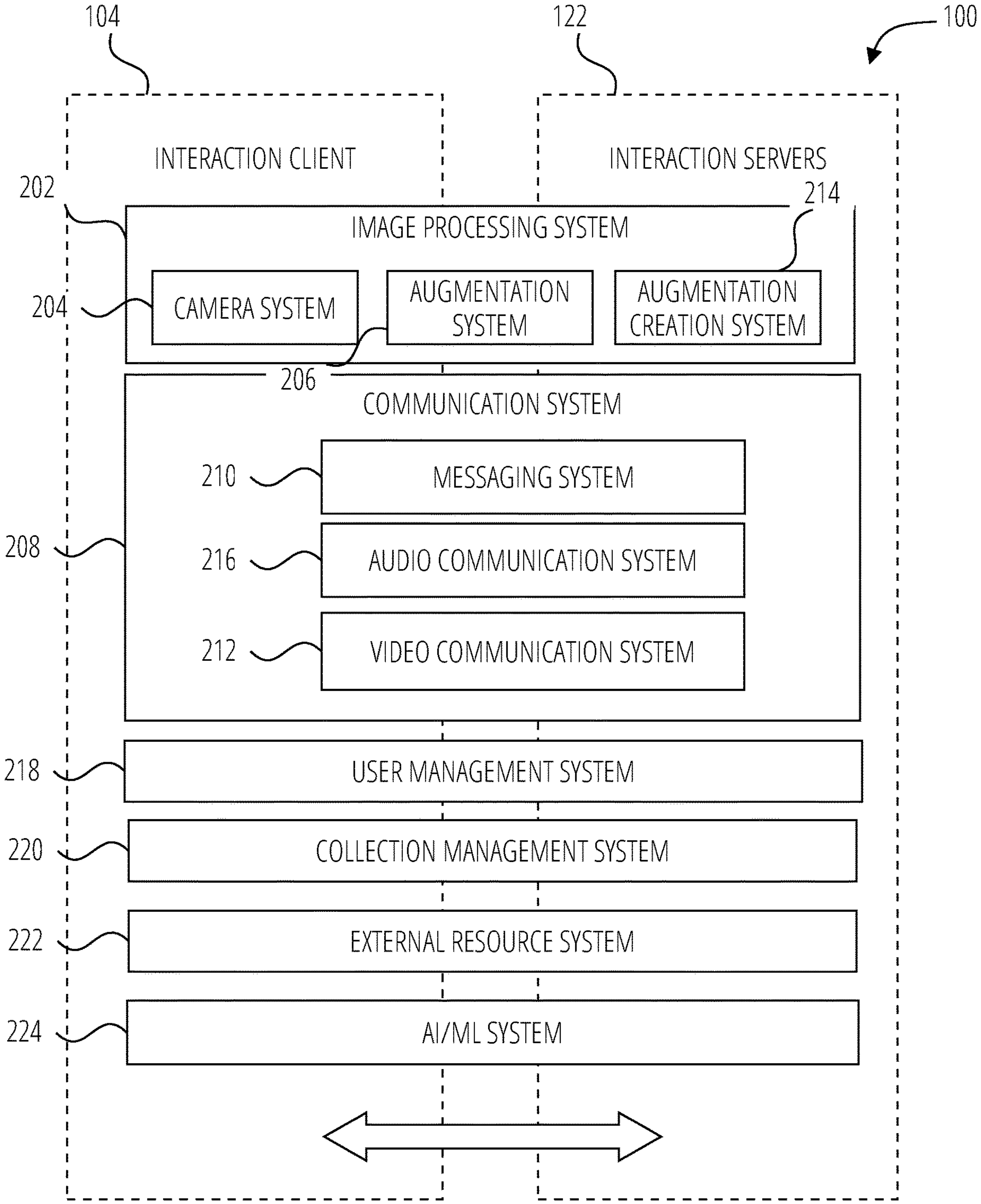
FIG. 2 is a diagrammatic representation of a messaging system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 122. The interaction system 100 embodies multiple subsystems, which are supported on the client-side by the interaction client 104 and on the server-side by the interaction servers 122. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanisms (e.g., using the database server 124 and database 126). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged to ensure availability and performance. Monitoring and logging mechanisms enable tracking health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to generating and publishing augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 502 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 126 and accessed through the database server 124.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

An external resource system 222 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 122. The SDK includes Application Programming Interfaces (APIs) with functions that can be called or invoked by the web-based application. The interaction servers 122 host a JavaScript library that provides a given external resource access to specific user data of the interaction client 104. HTML5 is an example of technology for programming games, but applications and resources programmed based on other technologies can be used.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An artificial intelligence and machine learning system 224 (also referred to as AI and ML system 224 or system 224) provides a variety of services to different subsystems within the interaction system 100. For example, the artificial intelligence and machine learning system 224 operates with the image processing system 202 and the camera system 204 to analyze images and extract information such as objects, text, or faces. This information can then be used by the image processing system 202 to enhance, filter, or manipulate images. The artificial intelligence and machine learning system 224 may be used by the augmentation system 206 to generate augmented content and augmented reality experiences, such as adding virtual objects or animations to real-world images. The communication system 208 and messaging system 210 may use the artificial intelligence and machine learning system 224 to analyze communication patterns and provide insights into how users interact with each other and provide intelligent message classification and tagging, such as categorizing messages based on sentiment or topic. The artificial intelligence and machine learning system 224 may also provide chatbot functionality to message interactions 118 between user systems 102 and between a user system 102 and the interaction server system 110. The artificial intelligence and machine learning system 224 may also work with the audio communication system 216 to provide speech recognition and natural language processing capabilities, allowing users to interact with the interaction system 100 using voice commands.

Figure 8:
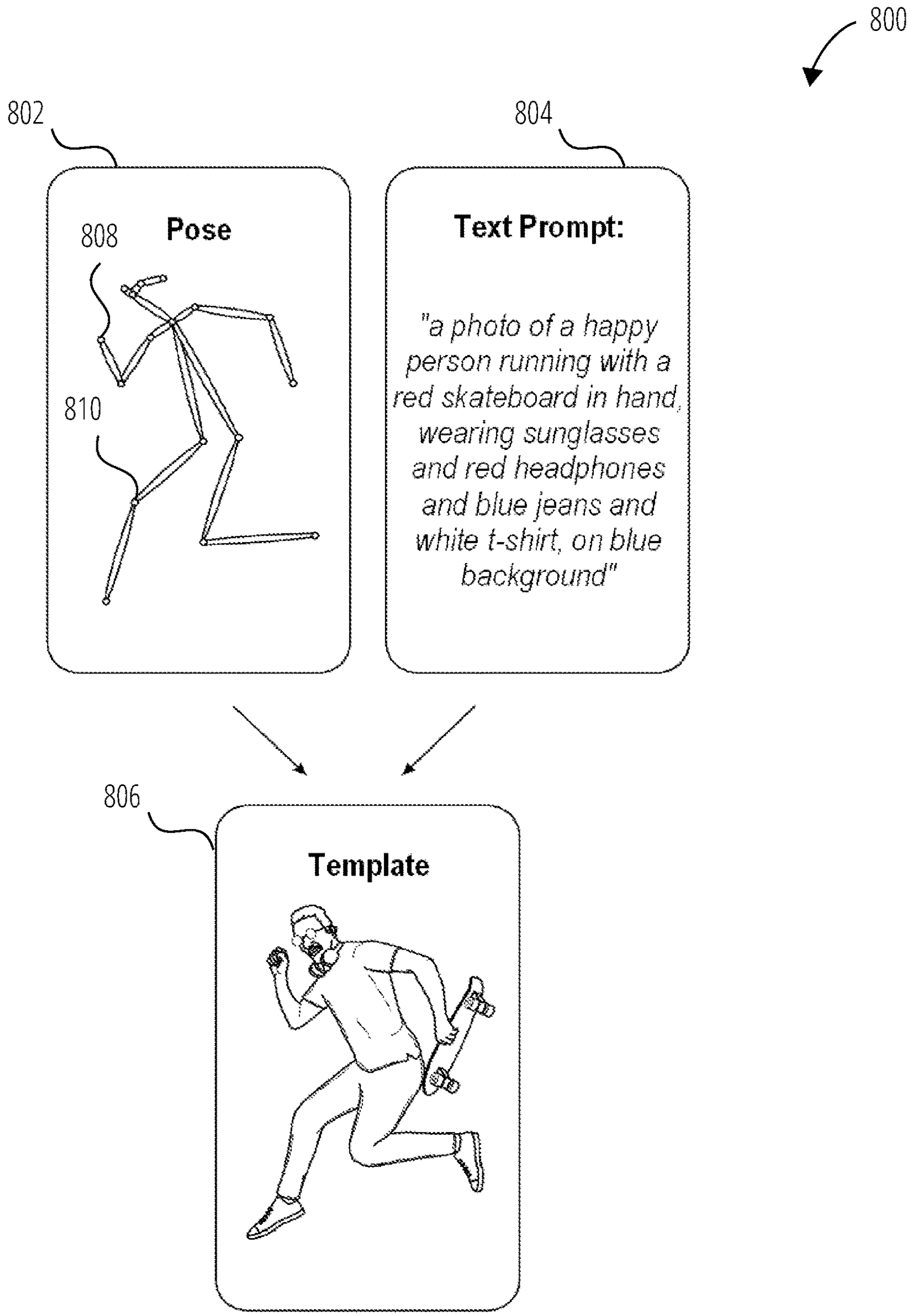
FIG. 8 illustrates an example template for generating personalized images, according to some examples.

In various examples, the artificial intelligence and machine learning system 224 (also referred to as AI and ML system 224 or system 224) generate and manage personalized images (e.g., AI-generated personalized narrative images) using one or more machine learning models (e.g., stable diffusion models). A personalized image, such as the example personalized image 1006 illustrated in FIG. 10, can be a synthesized image that is generated based on text prompts and one or more conditions (e.g., a sketch, a pose map, a depth map, a normal map, a canny edge). FIG. 8 illustrates an example pose map 802, an example text prompt 804, and an example template 806.

Data Architecture

Figure 3:
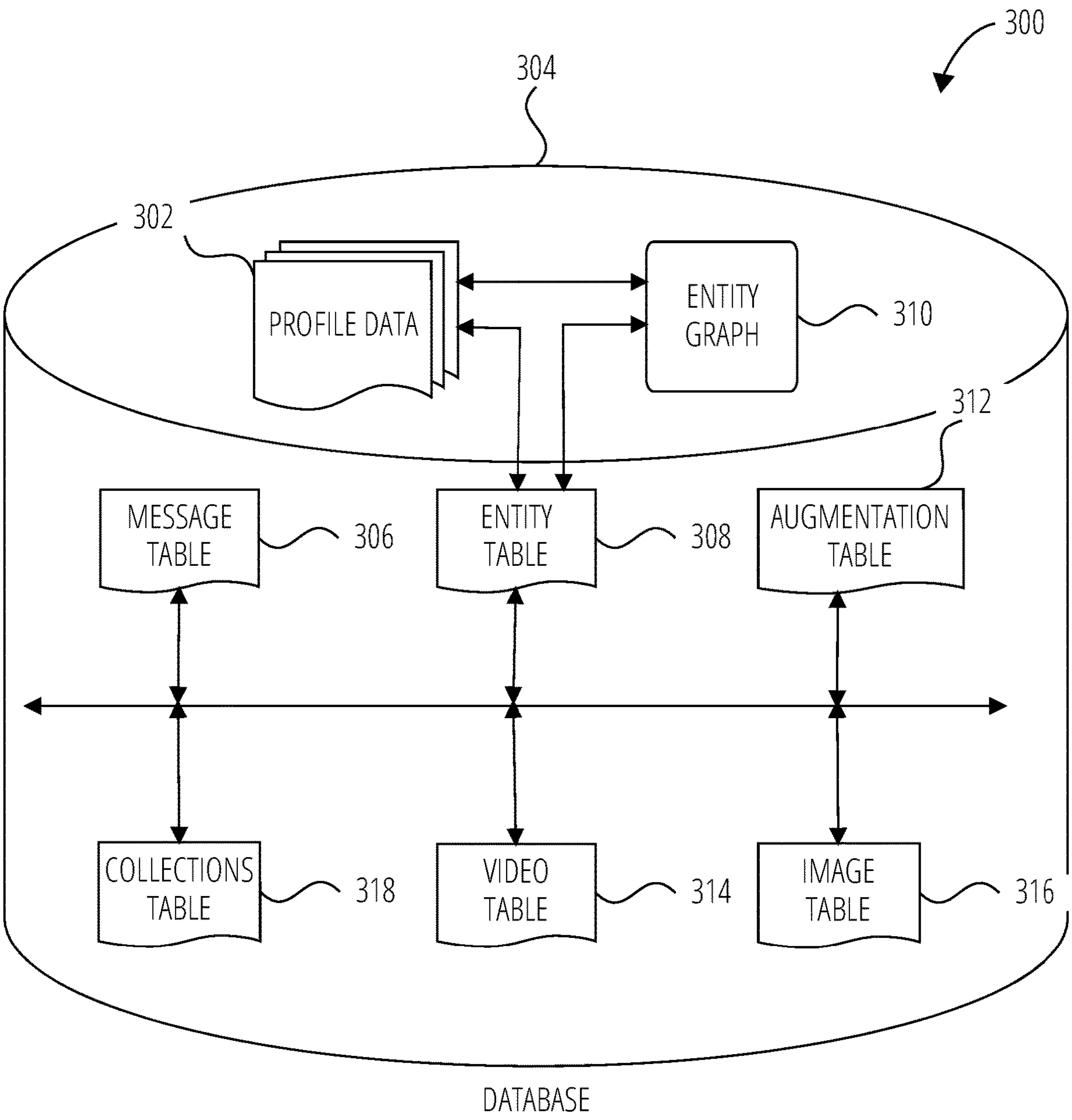
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

In various examples, one or more portrait images (e.g., selfies) of an entity (e.g., a person or an animal) can be obtained to generate an identity (e.g., AI-generated identity) that represents the entity.

The entity graph 310 stores information regarding relationships and associations (or connections) between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

In various examples, profile data 302 associated with an entity (e.g., a person or an animal) can include an AI-generated identity representing the entity and one or more personalized narrative images generated based on the identity and one or more templates described herein.

The database 304 also stores augmentation data, such as overlays or filters, in an augmentation table 312. The augmentation data is associated with and applied to videos (for which data is stored in a video table 314) and images (e.g., personalized images) (for which data is stored in an image table 316).

Filters, in some examples, are overlays that are displayed as overlaid on an image (e.g., personalized images) or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

Data Communications Architecture

Figure 4:
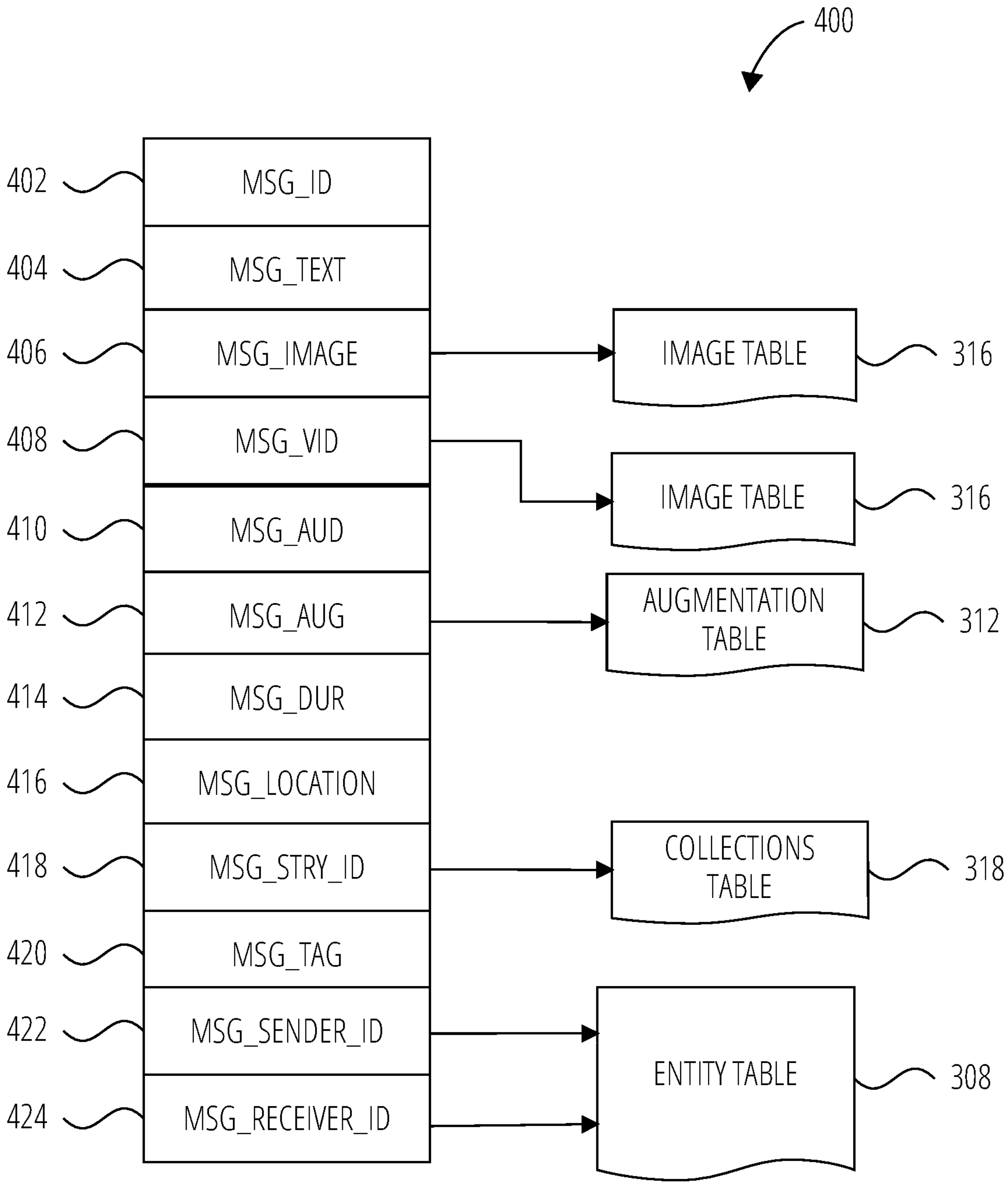
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 122. The content of a particular message 400 is used to populate the message table 306 stored within the database 304, accessible by the interaction servers 122. Similarly, the content of a message 400 is stored in memory as "in-transit" or "in-flight" data of the user system 102 or the interaction servers 122. A message 400 is shown to include the following example components:

- Message identifier 402: a unique identifier that identifies the message 400.
- Message text payload 404: text, to be generated by a user via a user interface of the user system 102, and that is included in the message 400.
- Message image payload 406: image data, captured by a camera component of a user system 102 or retrieved from a memory component of a user system 102, and that is included in the message 400. Image data for a sent or received message 400 may be stored in the image table 316.
- Message video payload 408: video data, captured by a camera component or retrieved from a memory component of the user system 102, and that is included in the message 400. Video data for a sent or received message 400 may be stored in the image table 316.
- Message audio payload 410: audio data, captured by a microphone or retrieved from a memory component of the user system 102, and that is included in the message 400.
- Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.
- Message duration parameter 414: parameter value indicating, in seconds, the amount of time for which content of the message (e.g., the message image payload 406, message video payload 408, message audio payload 410) is to be presented or made accessible to a user via the interaction client 104.
- Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- Message story identifier 418: identifier values identifying one or more content collections (e.g., "stories" identified in the collections table 318) with which a particular content item in the message image payload 406 of the message 400 is associated. For example, multiple images within the message image payload 406 may each be associated with multiple content collections using identifier values.
- Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- Message sender identifier 422: an identifier (e.g., a messaging system identifier, email address, or device identifier) indicative of a user of the user system 102 on which the message 400 was generated and from which the message 400 was sent.
- Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a collections table 318, and values stored within the message sender identifier 422 and the message receiver identifier 424 may point to user records stored within an entity table 308.

In various examples, personalized images can be further edited (e.g., adding media overlays) and transmitted to (or shared with) client devices of other users as one or more messages described herein. For example, the content of a message 400 that includes a personalized image can be used to populate the message table 306 stored within the database 304, accessible by the interaction servers 122.

Figure 5:
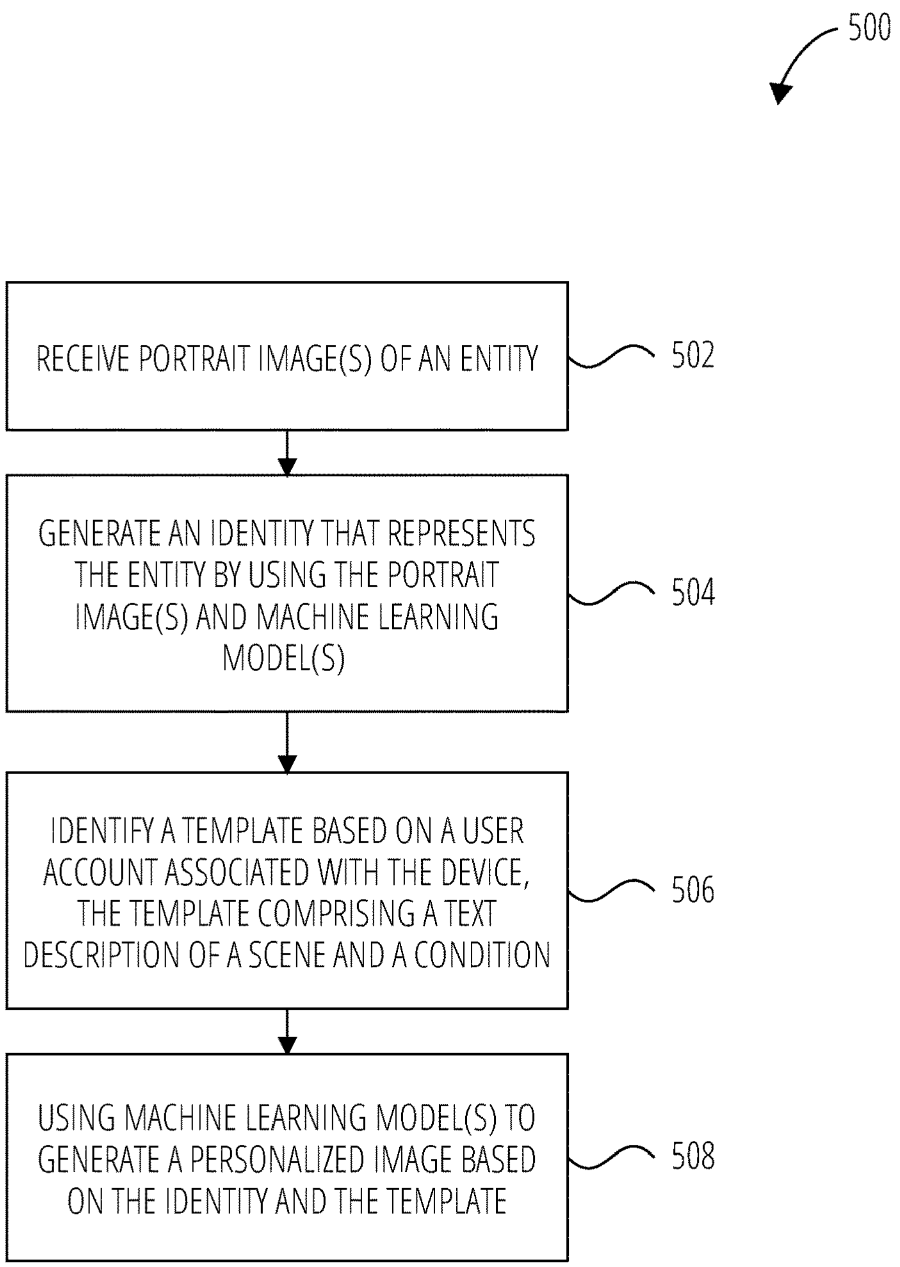
FIG. 5 is a flowchart that illustrates an example method for generating and managing personalized images using machine learning technologies, according to some examples.

FIG. 5 is a flowchart that illustrates an example method 500 for generating and managing personalized images using machine learning technologies, according to some examples. It will be understood that a machine may perform example methods described herein in accordance with some examples. For example, method 500 can be performed by the artificial intelligence and machine learning system 224 described with respect to FIG. 2 or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 500 may be represented by executable instructions that, when executed by a processor of a computing device, cause the computing device to perform method 500. Depending on the example, an operation of an example method described herein may be repeated in different ways or involve intervening operations not shown. Though the operations of example methods may be depicted and described in a certain order, the order in which the operations are performed may vary among examples, including performing certain operations in parallel.

At operation 502, a processor receives one or more portrait images of an entity from a device. A portrait image can be selfies (e.g., still images of an entity) captured by cameras (e.g., front camera, rear camera) communicatively coupled to user devices associated with the user system 102.

At operation 504, a processor uses one or more machine learning models (e.g., stable diffusion models) to generate an identity that represents the entity based on the one or more portrait images.

At operation 506, a processor identifies one or more templates based on a user account (or a user profile) associated with the device. A template can include one or more text descriptions (also referred to as text prompts) of a scene and one or more conditions (e.g., a sketch, a pose map, a depth map, a normal map, or a canny edge) that control the generation of personalized images (e.g., personalized narrative images) described herein. A scene can refer to a scene that tells a story and/or convey a message. In various embodiments, a text description (also referred to as a text prompt) of a scene can depict an entity (e.g., a person) that engages in an action and/or dialogue.

At operation 508, a processor uses the one or more machine learning models (e.g., stable diffusion models) to generate one or more personalized images based on the identity and the one or more templates.

Though not illustrated, method 500 can include an operation where a graphical user interface can be displayed (or caused to be displayed) by the hardware processor. For instance, the operation can cause a client device (e.g., the mobile device 114) to display the graphical user interface for generating and managing one or more personalized images. This operation for displaying the graphical user interface can be separate from operations 502 through 508 or, alternatively, form part of one or more of operations 502 through 508.

Figure 6:
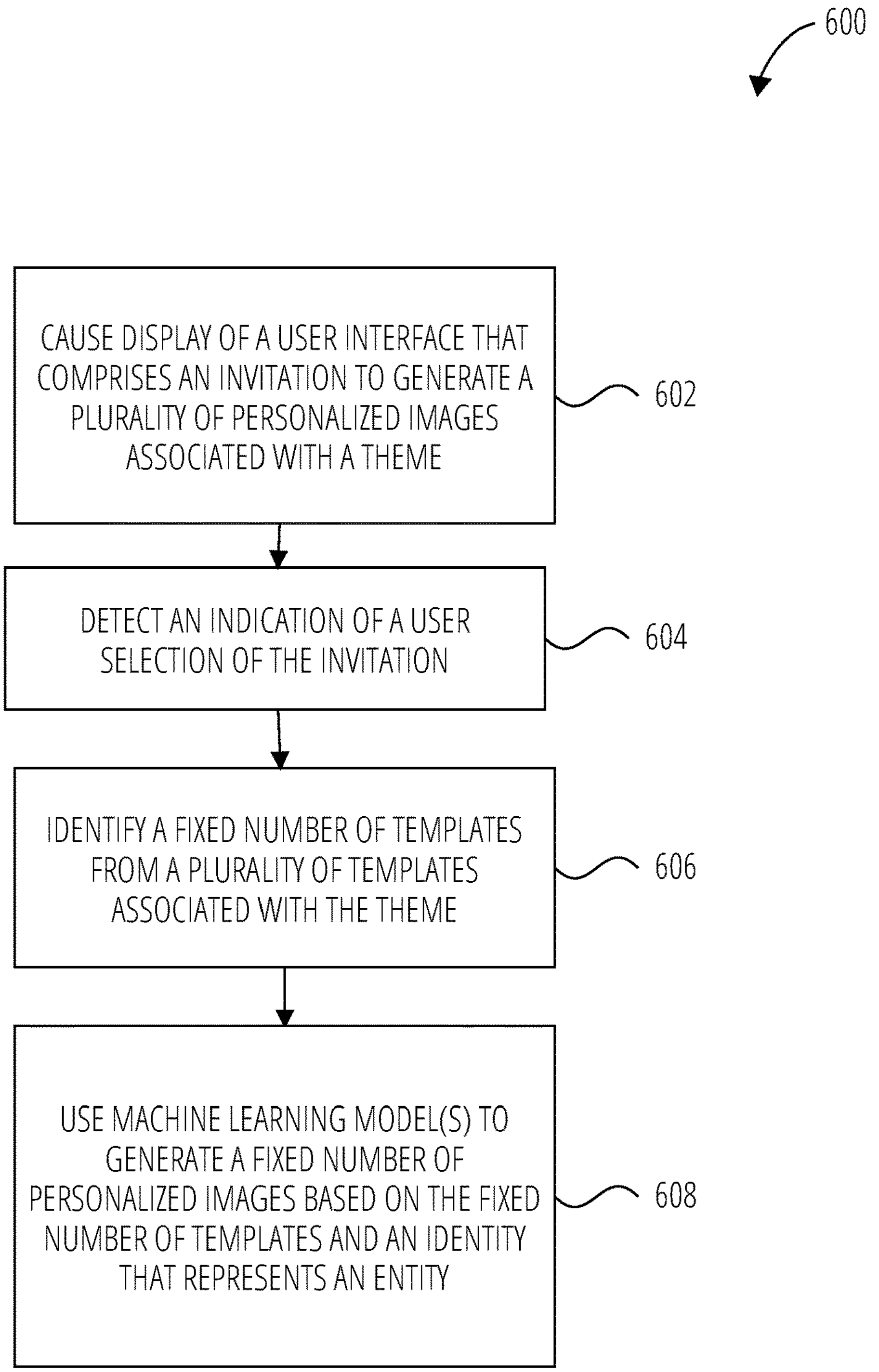
FIG. 6 is a flowchart that illustrates an example method for generating and managing personalized images using machine learning technologies, according to some examples.

FIG. 6 is a flowchart that illustrates an example method 600 for generating and managing personalized images using machine learning technologies, according to some examples. It will be understood that example methods described herein may be performed by a machine in accordance with some examples. For example, method 600 can be performed by the artificial intelligence and machine learning system 224 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 600 may be represented by executable instructions that, when executed by a processor of a computing device, cause the computing device to perform method 600. Depending on the example, an operation of an example method described herein may be repeated in different ways or involve intervening operations not shown. Though the operations of example methods may be depicted and described in a certain order, the order in which the operations are performed may vary among examples, including performing certain operations in parallel.

Figure 9:
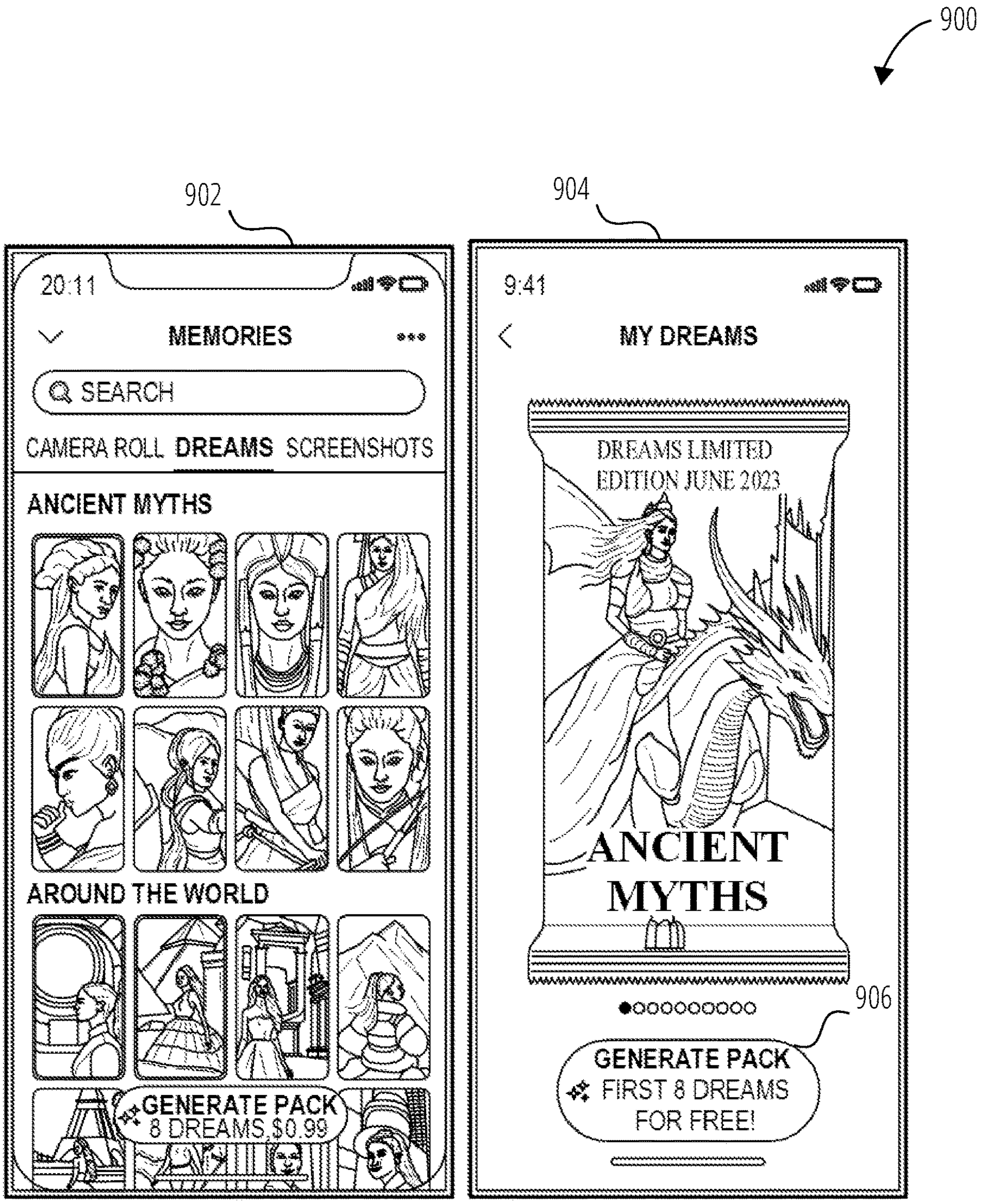
FIG. 9 illustrates example graphical user interfaces caused to be displayed by an example system during operation, according to some examples.

At operation 602, a processor causes display of a user interface on a device (e.g., mobile device 114). The user interface (e.g., user interface 904) includes an invitation (e.g., invitation 906) to generate a plurality of personalized images associated with a theme (e.g., ancient myths). As illustrated in FIG. 9, the invitation 906 corresponds to a user-selectable user interface (UI) element associated with a text indicator stated as "generate pack, first 8 dreams for free." A Dream can be referred to as a personalized image described herein.

At operation 604, a processor detects an indication of a user selection of the invitation (e.g., the invitation 906).

At operation 606, a processor identifies a fixed number of templates from a plurality of templates associated with the theme. For example, fixed number of templates (e.g., 8 templates) can be randomly selected from a plurality of templates (e.g., 16 templates) included in a pack. A pack of templates can correspond to a single theme.

At operation 608, a processor uses one or more machine learning models (e.g., stable diffusion models) to generate a fixed number of personalized images based on the fixed number of templates and the identity that represents the entity. In various examples, each personalized image is generated based on a single template that includes one or more text descriptions and one or more conditions. Different personalized images can be generated based on the same template for the same entity.

Though not illustrated, method 600 can include an operation where a graphical user interface can be displayed (or caused to be displayed) by the hardware processor. For instance, the operation can cause a client device (e.g., the mobile device 114) to display the graphical user interface for generating and managing one or more personalized images. This operation for displaying the graphical user interface can be separate from operations 602 through 608 or, alternatively, form part of one or more of operations 602 through 608.

Figure 7:
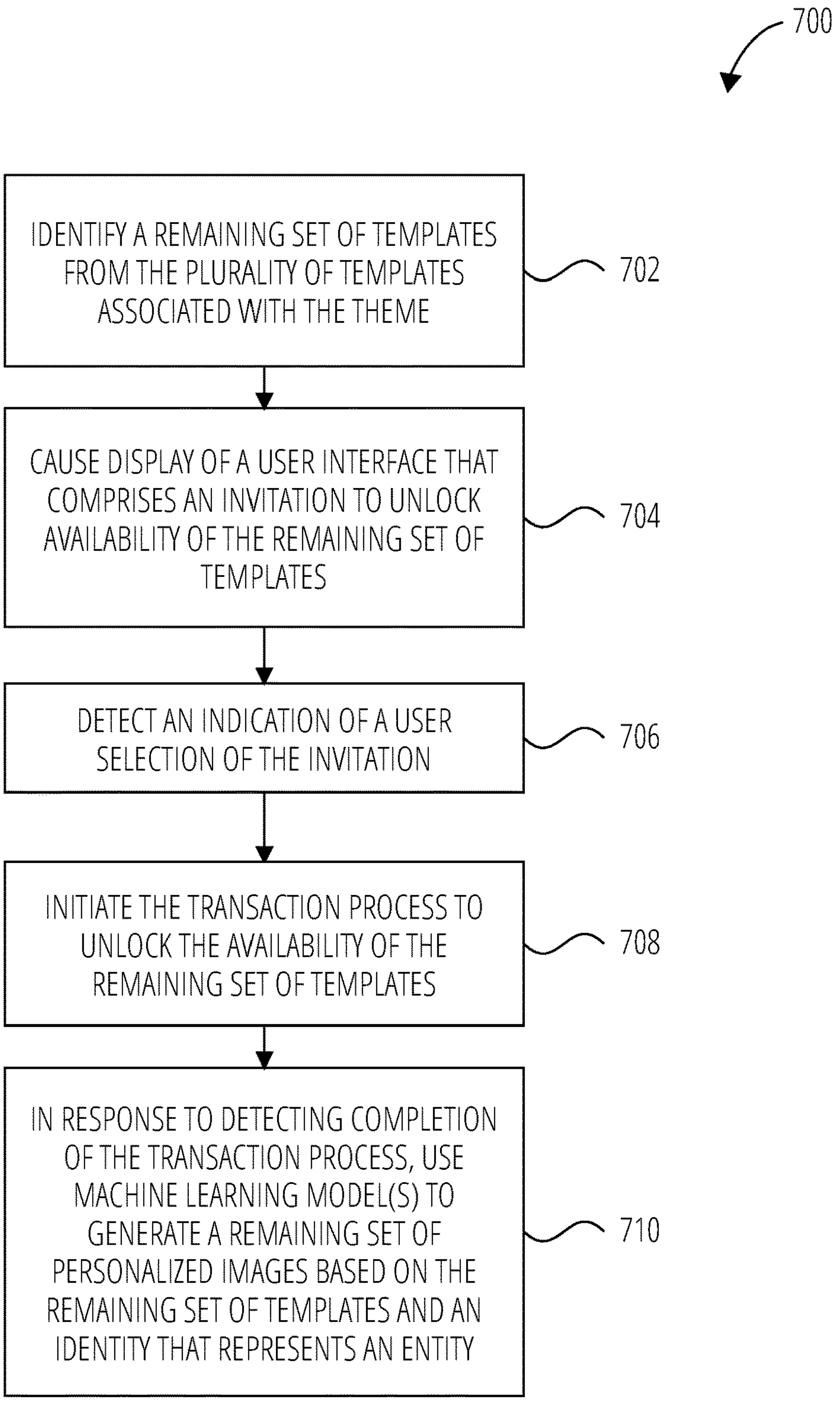
FIG. 7 is a flowchart that illustrates an example method for generating and managing personalized images using machine learning technologies, according to some examples.

FIG. 7 is a flowchart that illustrates an example method for generating and managing personalized images using machine learning technologies, according to some examples. is a flowchart that illustrates an example method 700 for generating and managing personalized images using machine learning technologies, according to some examples. It will be understood that a machine may perform example methods described herein in accordance with some examples. For example, method 700 can be performed by the artificial intelligence and machine learning system 224 described with respect to FIG. 2 or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 700 may be represented by executable instructions that, when executed by a processor of a computing device, cause the computing device to perform method 700. Depending on the example, an operation of an example method described herein may be repeated in different ways or involve intervening operations not shown. Though the operations of example methods may be depicted and described in a certain order, the order in which the operations are performed may vary among examples, including performing certain operations in parallel.

At operation 702, a processor identifies a remaining set of templates from the plurality of templates associated with the theme (e.g., ancient myths).

At operation 704, a processor causes display of a user interface (e.g., user interface 1002) on the device (e.g., mobile device 114). The user interface can include an invitation (e.g., invitation 1008) to unlock the availability of the remaining set of templates.

At operation 706, a processor detects an indication of a user selection of the invitation (e.g., invitation 1008) via the device (e.g., mobile device 114).

Figure 11:
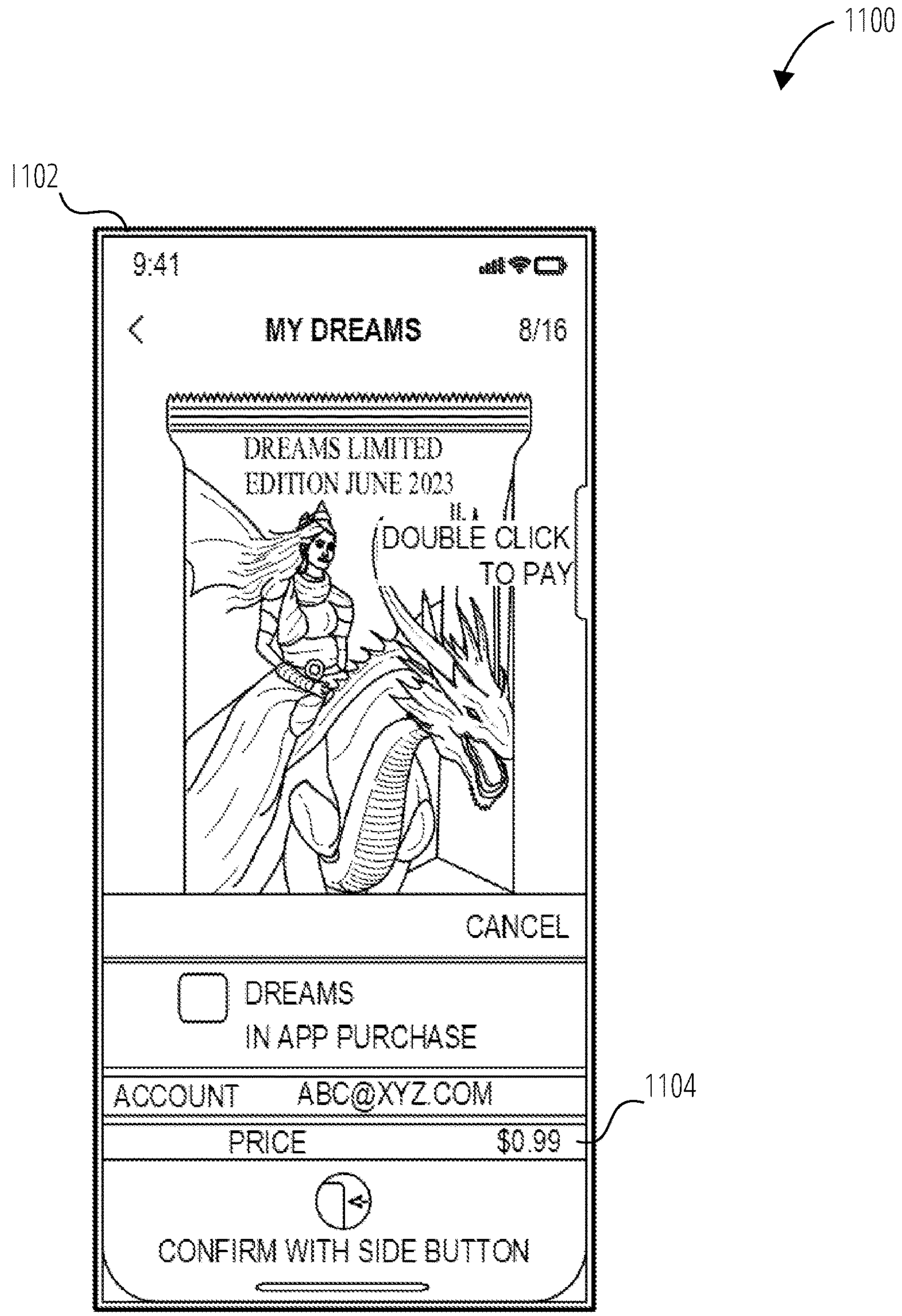
FIG. 11 illustrates an example graphical user interface caused to be displayed by an example system during operation, according to some examples.

At operation 708, a processor initiates a transaction process to unlock the availability of the remaining set of templates in exchange for an element, such as credit (e.g., in-app currency or rewards) that represents cash payment. In various examples, an element can be a cash payment charged via an external resource (e.g., an application or applet), as illustrated in FIG. 11.

Figure 10:
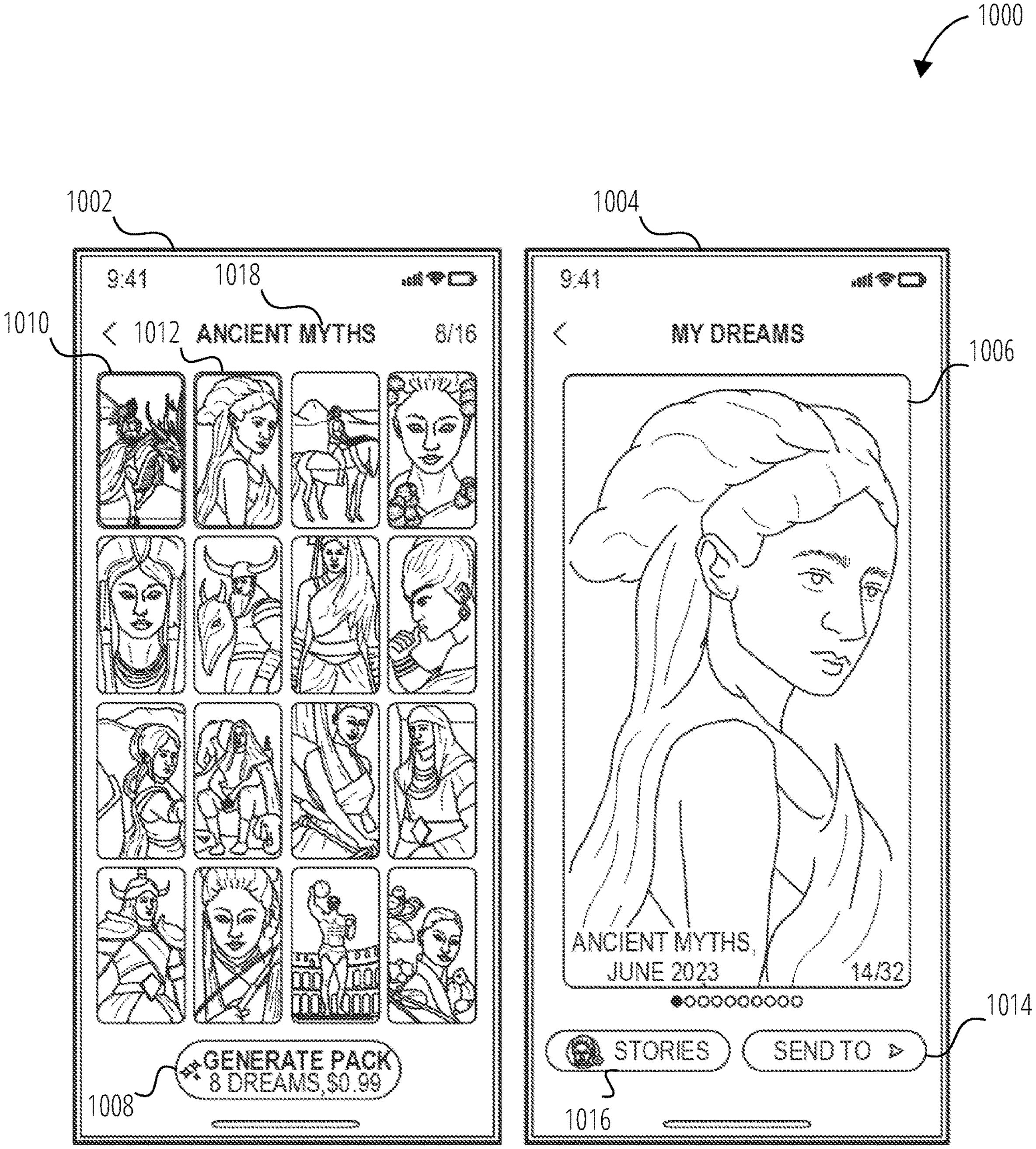
FIG. 10 illustrates example graphical user interfaces caused to be displayed by an example system during operation, according to some examples.

At operation 710, in response to detecting the completion of the transaction process, a processor uses the one or more machine learning models to generate personalized images based on the remaining set of templates and the identity that represents the entity. As illustrated in FIG. 10, user interface 1002 includes a plurality of images. Certain images, such as personalized mages 1010 and 1012, are illustrated with special outlines (e.g., illuminating outlines), indicating that they are generated based on preselected templates. In various examples, personalized images can be distinguished from generic images (i.e., images not generated based on identities) based on color. A user can choose to unlock the availability of the generic images by completing a transaction process described herein.

Though not illustrated, method 700 can include an operation where a graphical user interface can be displayed (or caused to be displayed) by the hardware processor. For instance, the operation can cause a client device (e.g., the mobile device 114) to display the graphical user interface for generating and managing one or more personalized images. This operation for displaying the graphical user interface can be separate from operations 702 through 710 or, alternatively, form part of one or more of operations 702 through 710.

FIG. 8 illustrates an example template for generating personalized images, according to some examples. As shown, FIG. 8 illustrates an example pose map 802, an example text prompt 804, and an example template 806. Template 806 can include one or more text descriptions of a scene and/or an entity and one or more conditions (e.g., a sketch, a pose map, a depth map, a normal map, or a canny edge). A condition (e.g., pose map 802) can control the generation of personalized images (e.g., personalized narrative images) described herein.

In various embodiments, a text prompt can be a positive text prompt (e.g., text prompt 804) or a negative text prompt. A combination of both positive text prompts and negative text prompts can be used to generate one or more templates (e.g., template 806) described herein. A negative text prompt can provide more stable results with fewer artifacts. In various embodiments, positive text prompt can steer the diffusion toward the images associated with it, whereas negative text prompt can steer the diffusion away from it. An example negative text prompt can be "deformed, distorted, disfigured, poorly drawn, bad anatomy, wrong anatomy, extra limb, missing limb, floating limbs, mutated hands and fingers, disconnected limbs, mutation, mutated, nudes, nude breasts, ugly, disgusting, blurry, amputation, unclear." In various embodiments, a text prompt (e.g., a positive text prompt or a negative text prompt) can be modified to generate a modified template (e.g., template 806).

In various examples, pose map 802 allows a machine learning model (e.g., stable diffusion model) to replicate the same pose of the individual subject (e.g., a person) based on the positions of the detected key points (e.g., Key points 808 and 810) in an image. When generating a personalized image, the machine learning model can generate the texture and surface of the individual subject based on other conditions described herein.

In various examples, a depth map (not shown) can be an image (e.g., grayscale image or color image) that includes information (e.g., illuminance in proportion to the distance from a camera, luminance in relation to the distances from a nominal focal plane) related to the distance of the surfaces of scene objects from a viewpoint. When generating a personalized image, a machine learning model (e.g., stable diffusion model) can follow the structure of the depth map and fill in the details as needed.

FIG. 9 illustrates example graphical user interfaces caused to be displayed by an example system (e.g., system 224) during operation, according to some examples. As shown, FIG. 9 includes a user interface 902 and a user interface 904. The user interface 902 illustrates two themes (i.e., ancient myths and around the world). Each theme corresponds to a set that can refer to a plurality of templates united by a common theme (e.g., theme 1018) or setting. A pack can refer to a collection of randomly selected templates from a set.

In various examples, a template can include assets to generate a personalized image (e.g., personalized image 1006). Unlocked templates can refer to templates based on which personalized images are generated.

In various embodiments, the first pack of templates from a given theme (e.g., theme 1018) can be randomly selected and offered to users to generate personalized images for free. Any remaining templates from the given theme can be grouped into packs and offered to users for purchase. One or more pre-selected templates can be determined by the system 224 or an administrative user associated with the system 224. There should be no duplicated templates between packs generated for the same theme.

In various embodiments, there is a maximum number of packs a user can obtain from each set. For example, a set includes 32 templates. A user should be able to unlock all templates from the set by obtaining 4 packs of templates (e.g., 8 templates in each pack).

FIG. 10 illustrates example graphical user interfaces caused to be displayed by an example system (e.g., system 224) during operation, according to some examples. As shown, FIG. 10 includes a user interface 1002 and a user interface 1004. User interface 1002 includes a plurality of templates associated with the theme 1018 (i.e. ancient myths). Certain templates can be randomly selected and made available for generating personalized images free of charge. In contrast, the rest of the template (including preselected templates) can only be made available via completing a transaction process, as illustrated in FIG. 11. User interface 1004 illustrates a personalized image 1006 generated based on a template associated with the theme "ancient myths" and an identity representing an entity (e.g., a user of the mobile device 114). The personalized image 1006 can be edited (e.g., adding media overlays), augmented (e.g., applying augmentations described herein) and transmitted (as an ephemeral message) to other users by activating the user-selectable element 1014. The personalized image 1006 can also be generated as a story (e.g., personal story or live story) by activating the user-selectable element 1016.

FIG. 11 illustrates an example graphical user interface caused to be displayed by an example system (e.g., system 224) during operation, according to some examples. As shown, user interface 1102 illustrates an example user interface to complete a transaction process. A user of a device (e.g., mobile device 114) can choose to unlock the availability of certain templates in exchange for an element (e.g., element 1104) that is charged via an external resource (e.g., an application or applet).

Figure 12:
FIG. 12 illustrates example graphical user interfaces caused to be displayed by an example system during operation, according to some examples.

FIG. 12 illustrates example graphical user interfaces caused to be displayed by an example system (e.g., system 224) during operation, according to some examples. As shown, user interface 1202 includes a user-selectable element 1212 that allows the selection of friends (e.g., friend 1206) with identities generated by the artificial intelligence and machine learning system 224. Upon selection, a user can cause the artificial intelligence and machine learning system 224 to generate personalized images based on templates (e.g., template 1208) that include multiple entities.

Figure 13:
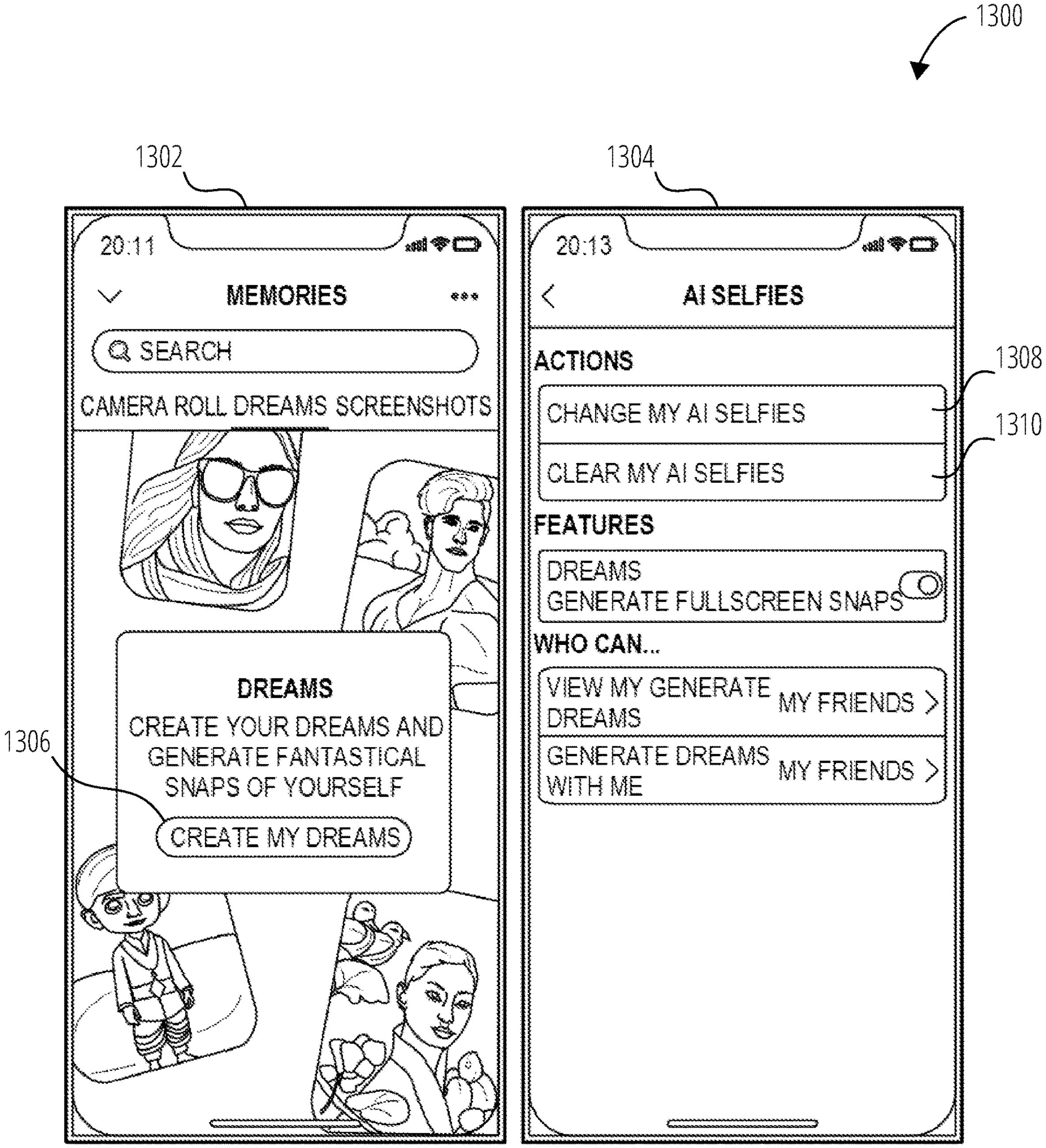
FIG. 13 illustrates example graphical user interfaces caused to be displayed by an example system during operation, according to some examples.

FIG. 13 illustrates an example graphical user interface caused to be displayed by an example system (e.g., system 224) during operation, according to some examples. As shown, user interface 1302 includes a user-selectable element 1306 that invites users to generate personalized images (e.g., personalized images 1006). Upon selecting the user-selectable element 1306, a further user interface (not shown) may be generated to provide means to collect portrait images (e.g., selfies) of the user. Portrait images can be used to generate one or more AI-generated identities that represent the user. In various examples, identities can be generated for animals or other objects.

As shown, user interface 1304 includes user-selectable elements (e.g., user-selectable element 1308 and user-selectable element 1310) that allow for changing or removing one's identities (e.g., AI selfies). A user can also view a connected user's personalized images and cause artificial intelligence and machine learning system 224 to generate images based on the templates in the same pack.

In various examples, a user can unlock the availability of particular templates and generate personalized images with a particular friend. In some examples, the availability of the particular templates has to be unlocked (e.g., purchased) again if the user wishes to generate personalized images with another friend using the same templates.

Machine Architecture

Figure 14:
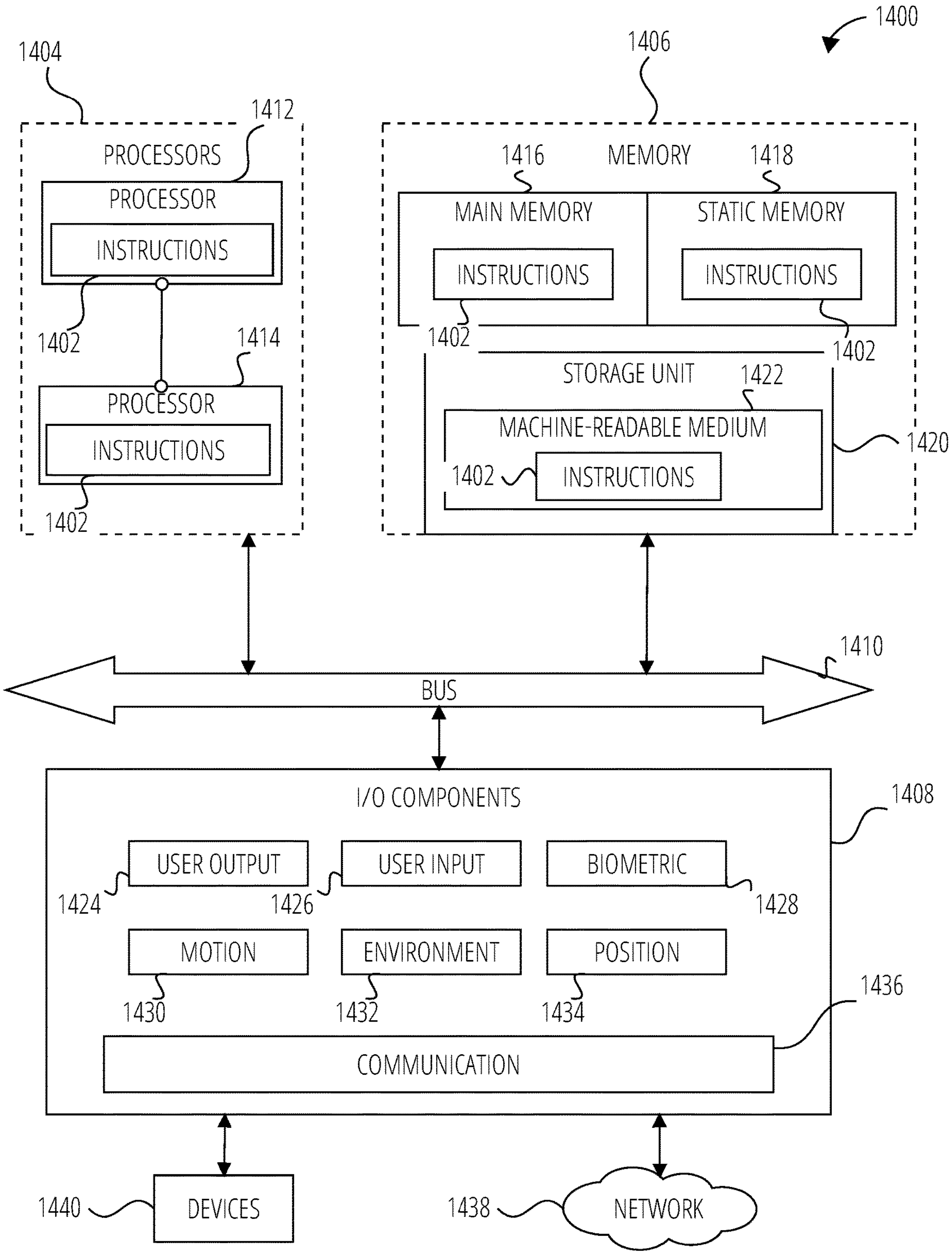
FIG. 14 is a diagrammatic representation of a machine in the form of a computer system within which a set of instructions may be executed to cause the machine to perform any one or more of the methodologies discussed herein, according to some examples.

FIG. 14 is a diagrammatic representation of the machine 1400 within which instructions 1402 (e.g., software, a program, an application, an applet, an app, or other executable code) for causing the machine 1400 to perform any one or more of the methodologies discussed herein may be executed. For example, the instructions 1402 may cause the machine 1400 to execute any one or more of the methods described herein. The instructions 1402 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1402, sequentially or otherwise, that specify actions to be taken by the machine 1400. Further, while a single machine 1400 is illustrated, the term "machine" shall also be taken to include a collection of machines that individually or jointly execute the instructions 1402 to perform any one or more of the methodologies discussed herein. The machine 1400, for example, may comprise the user system 102 or any one of multiple server devices forming part of the interaction server system 110. In some examples, the machine 1400 may also comprise both client and server systems, with certain operations of a particular method or algorithm being performed on the server-side and with certain operations of the particular method or algorithm being performed on the client-side.

The machine 1400 may include processors 1404, memory 1406, and input/output I/O components 1408, which may be configured to communicate with each other via a bus 1410. In an example, the processors 1404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1412 and a processor 1414 that execute the instructions 1402. The term "processor" is intended to include multi-core processors that may comprise two or more independent processors (sometimes referred to as "cores") that may execute instructions contemporaneously. Although FIG. 14 shows multiple processors 1404, the machine 1400 may include a single processor with a single-core, a single processor with multiple cores (e.g., a multi-core processor), multiple processors with a single core, multiple processors with multiples cores, or any combination thereof.

The memory 1406 includes a main memory 1416, a static memory 1418, and a storage unit 1420, both accessible to the processors 1404 via the bus 1410. The main memory 1406, the static memory 1418, and storage unit 1420 store the instructions 1402 embodying any one or more of the methodologies or functions described herein. The instructions 1402 may also reside, completely or partially, within the main memory 1416, within the static memory 1418, within machine-readable medium 1422 within the storage unit 1420, within at least one of the processors 1404 (e.g., within the processor's cache memory), or any suitable combination thereof, during execution thereof by the machine 1400.

The I/O components 1408 may include a wide variety of components to receive input, provide output, produce output, transmit information, exchange information, capture measurements, and so on. The specific I/O components 1408 that are included in a particular machine will depend on the type of machine. For example, portable machines such as mobile phones may include a touch input device or other such input mechanisms, while a headless server machine will likely not include such a touch input device. It will be appreciated that the I/O components 1408 may include many other components that are not shown in FIG. 14. In various examples, the I/O components 1408 may include user output components 1424 and user input components 1426. The user output components 1424 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1426 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1408 may include biometric components 1428, motion components 1430, environmental components 1432, or position components 1434, among a wide array of other components. For example, the biometric components 1428 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 1430 include acceleration sensor components (e.g., accelerometer), gravitation sensor components, rotation sensor components (e.g., gyroscope).

The environmental components 1432 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1434 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1408 further include communication components 1436 operable to couple the machine 1400 to a network 1438 or devices 1440 via respective coupling or connections. For example, the communication components 1436 may include a network interface component or another suitable device to interface with the network 1438. In further examples, the communication components 1436 may include wired communication components, wireless communication components, cellular communication components, Near Field Communication (NFC) components, Bluetooth® components (e.g., Bluetooth® Low Energy), Wi-FiR components, and other communication components to provide communication via other modalities. The devices 1440 may be another machine or any of a wide variety of peripheral devices (e.g., a peripheral device coupled via a USB).

Moreover, the communication components 1436 may detect identifiers or include components operable to detect identifiers. For example, the communication components 1436 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1436, such as location via Internet Protocol (IP) geolocation, location via Wi-Fi® signal triangulation, location via detecting an NFC beacon signal that may indicate a particular location, and so forth.

The various memories (e.g., main memory 1416, static memory 1418, and memory of the processors 1404) and storage unit 1420 may store one or more sets of instructions and data structures (e.g., software) embodying or used by any one or more of the methodologies or functions described herein. These instructions (e.g., the instructions 1402), when executed by processors 1404, cause various operations to implement the disclosed examples.

The instructions 1402 may be transmitted or received over the network 1438, using a transmission medium, via a network interface device (e.g., a network interface component included in the communication components 1436) and using any one of several well-known transfer protocols (e.g., hypertext transfer protocol (HTTP)). Similarly, the instructions 1402 may be transmitted or received using a transmission medium via a coupling (e.g., a peer-to-peer coupling) to the devices 1440.

Software Architecture

Figure 15:
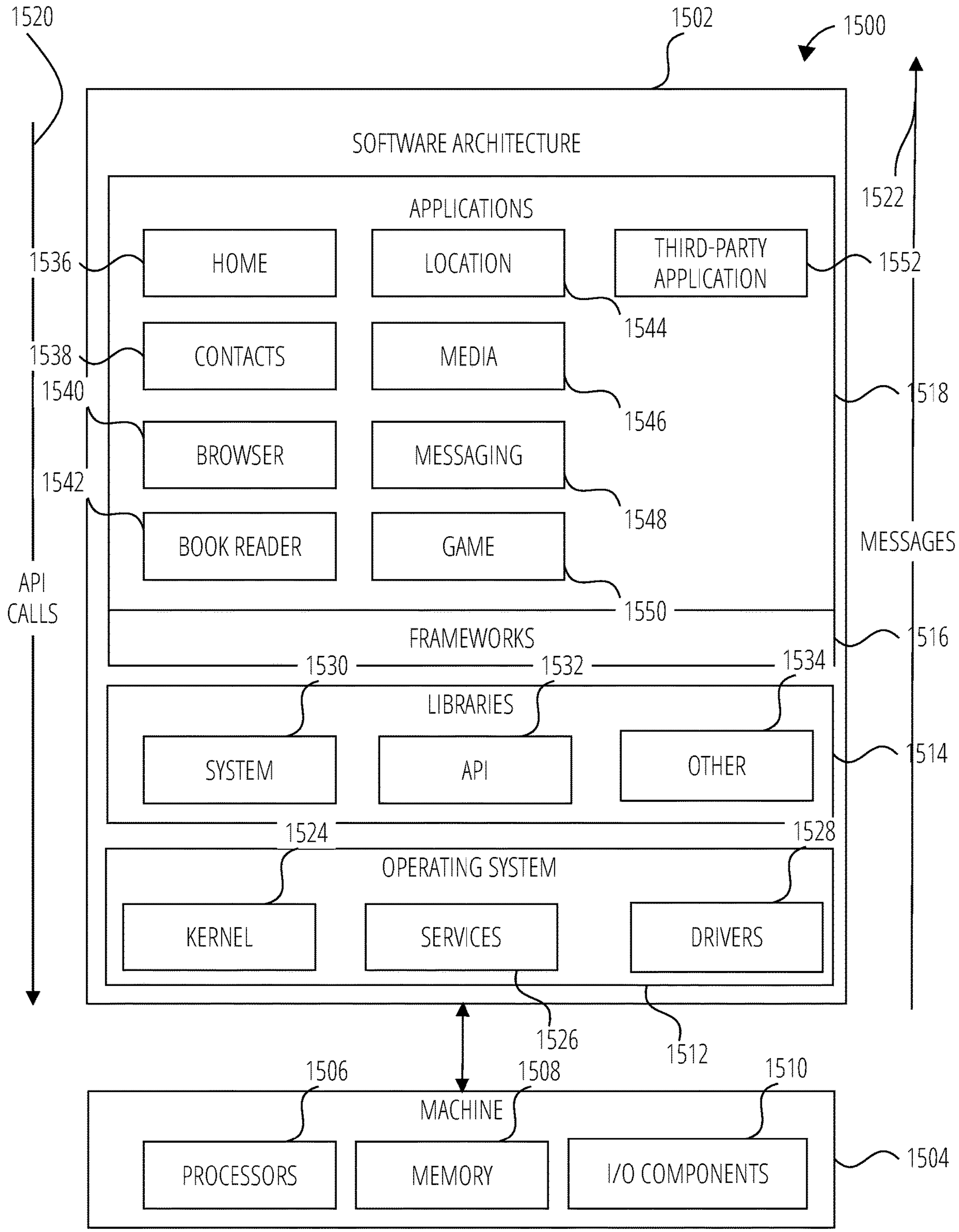
FIG. 15 is a block diagram showing a software architecture within which examples may be implemented.

FIG. 15 is a block diagram 1500 illustrating a software architecture 1502, which can be installed on any one or more of the devices described herein. The software architecture

1502 is supported by hardware such as a machine 1504 that includes processors 1506, memory 1508, and I/O components 1510. In this example, the software architecture 1502 can be conceptualized as a stack of layers, where each layer provides a particular functionality. The software architecture 1502 includes layers such as an operating system 1512, libraries 1514, frameworks 1516, and applications 1518. Operationally, the applications 1518 invoke API calls 1520 through the software stack and receive messages 1522 in response to the API calls 1520.

The operating system 1512 manages hardware resources and provides common services. The operating system 1512 includes, for example, a kernel 1524, services 1526, and drivers 1528. The kernel 1524 acts as an abstraction layer between the hardware and the other software layers. For example, the kernel 1524 provides memory management, processor management (e.g., scheduling), component management, networking, and security settings, among other functionalities. The services 1526 can provide other common services for the other software layers. The drivers 1528 are responsible for controlling or interfacing with the underlying hardware. For instance, the drivers 1528 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1514 provide a common low-level infrastructure used by the applications 1518. The libraries 1514 can include system libraries 1530 (e.g., C standard library) that provide functions such as memory allocation functions, string manipulation functions, mathematic functions, and the like. In addition, the libraries 1514 can include API libraries 1532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1514 can also include a wide variety of other libraries 1534 to provide many other APIs to the applications 1518.

The frameworks 1516 provide a common high-level infrastructure that is used by the applications 1518. For example, the frameworks 1516 provide various graphical user interface (GUI) functions, high-level resource management, and high-level location services. The frameworks 1516 can provide a broad spectrum of other APIs that can be used by the applications 1518, some of which may be specific to a particular operating system or platform.

In an example, the applications 1518 may include a home application 1536, a contacts application 1538, a browser application 1540, a book reader application 1542, a location application 1544, a media application 1546, a messaging application 1548, a game application 1550, and a broad assortment of other applications such as a third-party application 1552. The applications 1518 are programs that execute functions defined in the programs. Various programming languages can be employed to create one or more of the applications 1518, structured in a variety of manners, such as object-oriented programming languages (e.g., Objective-C, Java, or C++) or procedural programming languages (e.g., C or assembly language). In a specific example, the third-party application 1552 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1552 can invoke the API calls 1520 provided by the operating system 1512 to facilitate functionalities described herein.

EXAMPLES

Example 1 is a method including receiving, from a device, a portrait image of an entity; using a machine learning model to generate, based on the portrait image, an identity that represents the entity; identifying a template based on a user account associated with the device, the template comprising a text description of a scene and a condition; and using the machine learning model to generate a personalized image based on the identity and the template.

In Example 2 of the subject matter of Example 1, the machine learning model comprises a stable diffusion model, and wherein the personalized image comprises a personalized narrative image that illustrates the entity in a story scene.

In Example 3 of the subject matter of Example 1, the condition comprises a visual resource that controls a generation of the personalized image, the visual resource comprising one of a sketch, a pose map, a depth map, a normal map, and a canny edge.

In Example 4, the subject matter of Example 1 includes causing display of a user interface on the device, the user interface comprising an invitation to generate a plurality of personalized images associated with a theme; detecting an indication of a user selection of the invitation; identifying a fixed number of templates from a plurality of templates associated with the theme, the fixed number of templates including the first template; and using the machine learning model to generate a fixed number of personalized images based on the fixed number of templates and the identity that represents the entity.

In Example 5 of the subject matter of Example 4, the fixed number of templates are identified based on a random selection, and wherein the plurality of templates associated with the theme comprises a preselected template that is not subject to the random selection.

In Example 6 of the subject matter of Example 4, the fixed number of templates is made available for the generating of the fixed number of personalized images without initiating a transaction process, wherein the user interface is a first user interface, and wherein the invitation is a first invitation. Example 6 includes identifying a remaining set of templates from the plurality of templates associated with the theme; and causing display of a second user interface on the device, the second user interface comprising a second invitation to unlock availability of the remaining set of templates.

In Example 7, the subject matter of Example 6 includes detecting an indication of a user selection of the second invitation; initiating the transaction process to unlock the availability of the remaining set of templates in exchange for an element; and in response to detecting completion of the transaction process, using the machine learning model to generate a remaining set of personalized images based on the remaining set of templates and the identity that represents the entity.

In Example 8, the subject matter of Example 1 includes causing display of the personalized image on a user interface of the device, the user interface comprising a user-selectable element that allows transmission of the personalized image to a further device associated with a further user account that is connected to the user account; detecting an indication of a user selection of the user-selectable element; and transmitting the personalized image as an ephemeral message to the further device.

In Example 9, the subject matter of Example 1 includes determining the template corresponds to a plurality of entities; and identifying a plurality of user accounts that are connected to the first user account, each of the plurality of user accounts being associated with an identity that is generated based on one or more portrait images of a corresponding entity, wherein the user account is a first user account.

In Example 10, the subject matter of Example 9 includes detecting an indication of a user selection of one or more entities from the plurality of entities; and using the machine learning model to generate the personalized image based on the template and the one or more entities.

Example 11 is a system to implement of any of Examples 1-10.

Example 20 is an apparatus comprising means to implement any of Examples 1-10.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. A system comprising:

at least one processor;

at least one memory component storing instructions that, when executed by the at least one processor, cause the at least one processor to perform operations comprising:

receiving, from a device, a portrait image of an entity;

generating an identity that represents the entity by using the portrait image and a machine learning model, the machine learning model comprising a stable diffusion model;

causing display of a user interface on the device, the user interface comprising an invitation to generate a plurality of personalized images associated with a theme:

detecting an indication of a user selection of the invitation;

identifying a fixed number of templates associated with the theme for image generation based on a user account associated with the device, each of the fixed number of templates for image generation comprising a text description of a themed story scene and an image conditioning; and using the machine learning model to generate a fixed number of personalized images based on the identity and the fixed number of templates.

2. The system of claim 1, wherein the personalized image comprises a personalized narrative image that illustrates the entity in a story scene.

3. The system of claim 1, wherein the condition comprises a visual resource that controls a generation of the personalized image, the visual resource comprising one of a sketch, a pose map, a depth map, a normal map, and a canny edge.

4. The system of claim 1, wherein the fixed number of templates are identified based on a random selection, and wherein the plurality of templates associated with the theme comprises a preselected template that is not subject to the random selection.

5. The system of claim 1, wherein the fixed number of templates is made available for the generating of the fixed number of personalized images without initiating a transaction process, wherein the user interface is a first user interface, wherein the invitation is a first invitation, and wherein the operations further comprise:

identifying a remaining set of templates from the plurality of templates associated with the theme; and causing display of a second user interface on the device, the second user interface comprising a second invitation to unlock availability of the remaining set of templates.

6. The system of claim 5, wherein the operations further comprise:

detecting an indication of a user selection of the second invitation;

initiating the transaction process to unlock the availability of the remaining set of templates in exchange for an element; and in response to detecting completion of the transaction process, using the machine learning model to generate a remaining set of personalized images based on the remaining set of templates and the identity that represents the entity.

7. The system of claim 1, wherein the operations further comprise:

causing display of the personalized image on a user interface of the device, the user interface comprising a user-selectable element that allows transmission of the personalized image to a further device associated with a further user account that is connected to the user account;

detecting an indication of a user selection of the user-selectable element; and transmitting the personalized image as an ephemeral message to the further device.

8. The system of claim 1, wherein the user account is a first user account, and wherein the operations further comprise:

determining the template corresponds to a plurality of entities; and identifying a plurality of user accounts that are connected to the first user account, each of the plurality of user accounts being associated with an identity that is generated based on one or more portrait images of a corresponding entity.

9. The system of claim 8, wherein the operations further comprise:

detecting an indication of a user selection of one or more entities from the plurality of entities; and using the machine learning model to generate the personalized image based on the template and the one or more entities.

10. A method comprising:

receiving, from a device, a portrait image of an entity;

generating an identity that represents the entity by using the portrait image and a machine learning model, the machine learning model comprising a stable diffusion model;

causing display of a user interface on the device, the user interface comprising an invitation to generate a plurality of personalized images associated with a theme;

detecting an indication of a user selection of the invitation;

identifying a fixed number of templates associated with the theme for image generation based on a user account associated with the device, each of the fixed number of templates for image generation comprising a text description of a themed story scene and an image conditioning; and using the machine learning model to generate a fixed number of personalized images based on the identity and the fixed number of templates.

11. The method of claim 10, wherein the personalized image comprises a personalized narrative image that illustrates the entity in a story scene.

12. The method of claim 10, wherein the condition comprises a visual resource that controls a generation of the personalized image, the visual resource comprising one of a sketch, a pose map, a depth map, a normal map, and a canny edge.

13. The method of claim 10, wherein the fixed number of templates are identified based on a random selection, and wherein the plurality of templates associated with the theme comprises a preselected template that is not subject to the random selection.

14. The method of claim 10, wherein the fixed number of templates is made available for the generating of the fixed number of personalized images without initiating a transaction process, wherein the user interface is a first user interface, and wherein the invitation is a first invitation, further comprising:

identifying a remaining set of templates from the plurality of templates associated with the theme; and causing display of a second user interface on the device, the second user interface comprising a second invitation to unlock availability of the remaining set of templates.

15. The method of claim 14, further comprising:

detecting an indication of a user selection of the second invitation;

initiating the transaction process to unlock the availability of the remaining set of templates in exchange for an element; and in response to detecting completion of the transaction process, using the machine learning model to generate a remaining set of personalized images based on the remaining set of templates and the identity that represents the entity.

16. The method of claim 10, further comprising:

causing display of the personalized image on a user interface of the device, the user interface comprising a user-selectable element that allows transmission of the personalized image to a further device associated with a further user account that is connected to the user account;

detecting an indication of a user selection of the user-selectable element; and transmitting the personalized image as an ephemeral message to the further device.

17. The method of claim 10, wherein the user account is a first user account, further comprising:

determining the template corresponds to a plurality of entities;

identifying a plurality of user accounts that are connected to the first user account, each of the plurality of user accounts being associated with an identity that is generated based on one or more portrait images of a corresponding entity;

detecting an indication of a user selection of one or more entities from the plurality of entities; and using the machine learning model to generate the personalized image based on the template and the one or more entities.

18. A non-transitory computer-readable storage medium storing instructions that, when executed by at least one processor, cause the at least one processor to perform operations comprising:

receiving, from a device, a portrait image of an entity;

generating an identity that represents the entity by using the portrait image and a machine learning model, the machine learning model comprising a stable diffusion model;

causing display of a user interface on the device, the user interface comprising an invitation to generate a plurality of personalized images associated with a theme;

detecting an indication of a user selection of the invitation;

identifying a fixed number of templates associated with the theme for image generation based on a user account associated with the device, each of the fixed number of templates for image generation comprising a text description of a themed story scene and an image conditioning; and using the machine learning model to generate a fixed number of personalized images based on the identity and the fixed number of templates.

* * * * *